United States Patent [19]
Pitts

[11] 3,975,052
[45] Aug. 17, 1976

[54] DEVICE TO STABILIZE A DUMP BODY VEHICLE ON LATERALLY ANGULATED TERRAIN BY MOVEMENT OF THE CONTENTS DURING THE ELEVATION THEREOF

[75] Inventor: Charles Cee Pitts, Bridgeport, Tex.
[73] Assignee: Hazel Y. Pitts, Ryan, Okla.
[22] Filed: Feb. 19, 1975
[21] Appl. No.: 551,041

[52] U.S. Cl. .................................. 298/1 B; 214/82
[51] Int. Cl.² ......................... B60P 1/00; B60P 1/16
[58] Field of Search ............... 298/1 B; 214/82, 510

[56] References Cited
UNITED STATES PATENTS

| | | | |
|---|---|---|---|
| 1,485,632 | 3/1924 | Shea | 214/82 |
| 3,465,902 | 9/1969 | Colletti | 214/82 |
| 3,626,489 | 12/1971 | Pioch | 298/1 B |
| 3,827,753 | 8/1974 | Pitts | 298/1 B |

Primary Examiner—Philip Goodman
Attorney, Agent, or Firm—Wayland D. Keith

[57] ABSTRACT

A device to be movably mounted on the floor of the dump body of a vehicle to loosen the contents and to move the lower strata of the contents toward the rear of the dump body as the dump body is elevated, to insure the rapid and even flow of the contents from the dump body before the dump body reaches a top heavy elevation, thereby eliminating the hazard of the dump body tipping over if the vehicle is situated on transversely uneven terrain. Mechanism is provided not only for the forward movement of the mover element but for the retraction thereof. Safety stops are provided to keep the mover element within the dump body, in case of malfunction of the operating mechanism.

7 Claims, 6 Drawing Figures

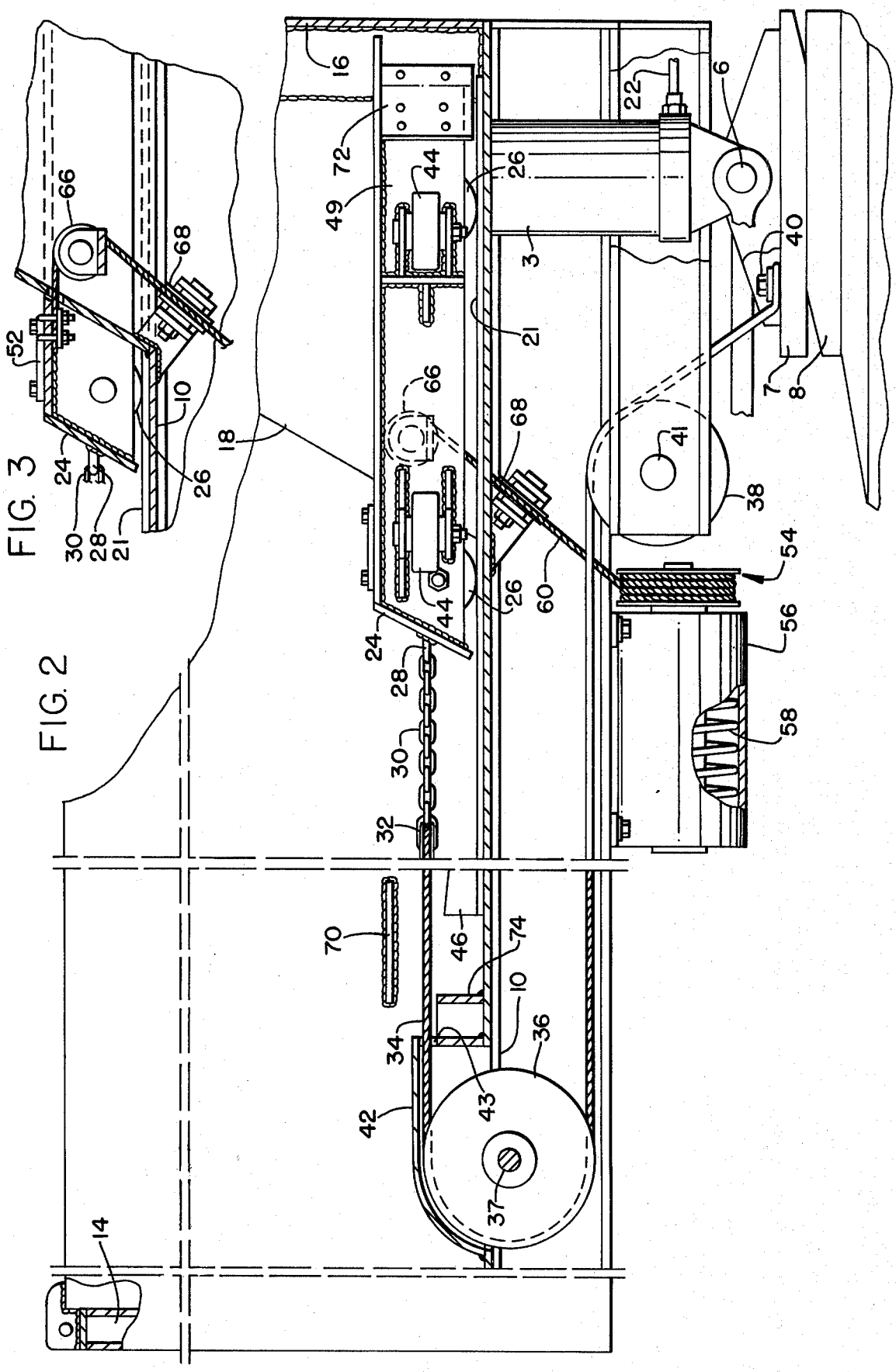

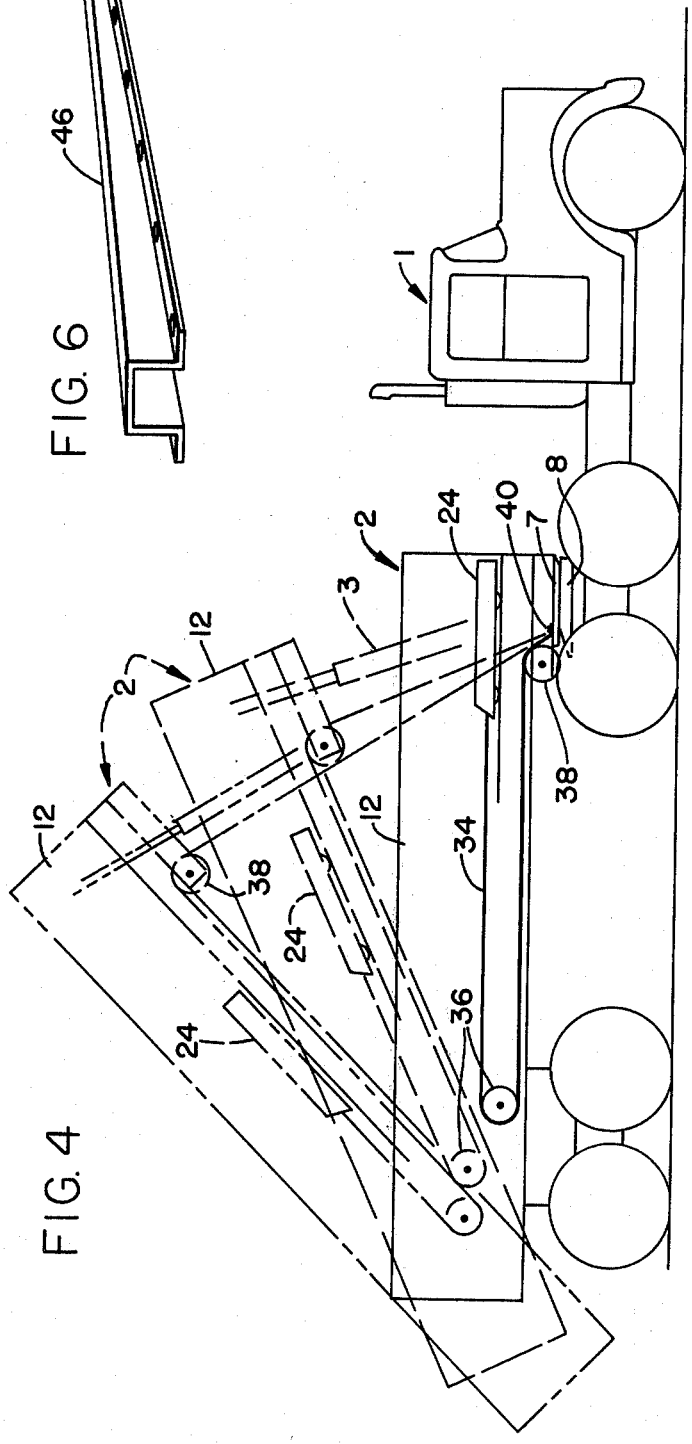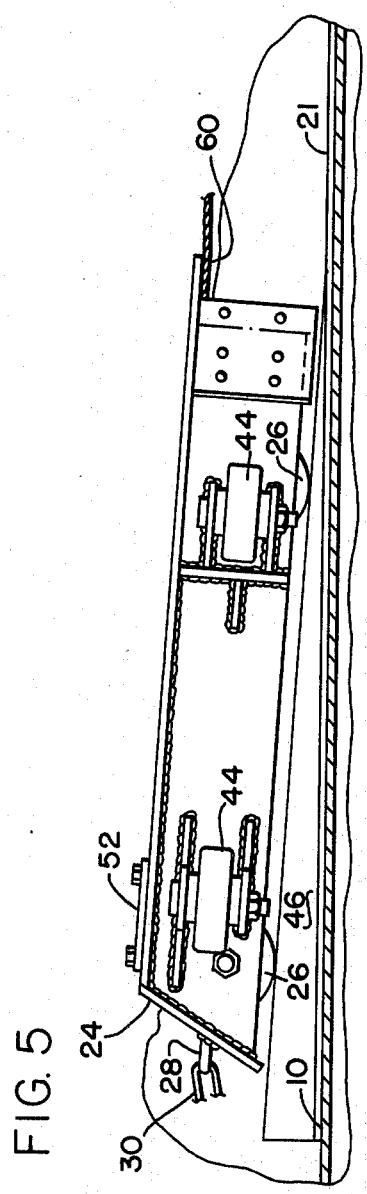

DEVICE TO STABILIZE A DUMP BODY VEHICLE ON LATERALLY ANGULATED TERRAIN BY MOVEMENT OF THE CONTENTS DURING THE ELEVATION THEREOF

BACKGROUND OF THE INVENTION

This invention relates to a mover element for attachment to the floor of a vehicle body, to move granular or dumpable material contained therein toward the rear of the dump body as the body is being elevated for dumping.

Various unloading devices have been proposed heretofore, but these, for the most part, were complex in construction and required complex mechanism for the operation thereof.

SUMMARY OF THE INVENTION

The present invention operates to aid in dumping the contents of the dump body of the vehicle, and can be used either with a trailer dump body or with a dump truck. The mover element, which constitutes the present invention is so constructed that, as the vehicle body is elevated, a "mole" type mechanism or mover element is pulled rearwardly along the floor of the dump body beneath the dumpable granular material, to cause a sliding movement of the material, which movement is started at the beginning of the elevation of the dump body. The mover element may be pulled rearward, in the dump body, by means of a cable which is anchored to a dump body support member mounted on the fifth-wheel, which cable is trained over sheaves, and the rate of movement of the mover element is multiplied in proportion to the movement of the sheaves used. The movement of the mover element accelerates the movement of the material within the dump body as the dump body is elevated, the opposite end of the cable is anchored to the rear of the mover element.

The cable and sheave arrangement is such that the mover element or "mole" will move twice the distance of the elevation of the dump body, therefore the movement of the dumpable material within the dump body of the vehicle along the bottom of the body will cause a sliding action of the entire load before the dump body reaches an appreciable angular elevation, and in so doing, the bulk of the material will be dumped from the vehicle body, thereby minimizing the hazard of the body tipping to one side or the other due to being top heavy when slightly angulated laterally.

When the movement of the material toward the rear end of the vehicle body starts, the rollers of the mover element move onto a pair of wedge-shaped elevating trackways. This movement of the mover element loosens the dumpable material within the dump body before the elevation of the body reaches a critical angle at which the body might be caused to tip sideways if the vehicle were situated on an angulated surface.

When the ram, or other lifting mechanism, has raised the body to the full height of the dumping position, the mover element will have been moved one-half the length of the dump body and will stop before it reaches and engages the safety abutments. These safety abutments are provided, one on each side wall, near the rear of the vehicle body, and will engage the mover element to prevent it passing out of the vehicle body, in event a cable should break or in event of other failure.

When the material is dumped from the vehicle body, and as the hydraulic boom lowers the body, a torsion spring winch, which is attached to a return cable, winds the cable onto the drum of the winch to move the mover element into its original position, near the forward end of the dump body at approximately the same time the vehicle dump body is lowered to the travel position thereof.

OBJECTS OF THE INVENTION

An object of this invention is to provide a mover element for a vehicle dump body, which mover element will pass beneath the dumpable material within the dump body to loosen and move the material in the dump body rearwardly as the dump body of the vehicle is being elevated.

Another object of the invention is to provide a mover element for a vehicle dump body, which element will be moved rearwardly by means of a cable, in proportioned relation to the elevational movement of the dump body.

A further object of the invention is to provide a mover element which moves the material within a vehicle dump body rearwardly twice as fast as the rate of elevation of the dump body so the greater portion of the material is urged from the dump body before the dump body has attained the maximum elevation.

Yet another object of the invention is to provide a mover element which moves onto elevated tracks to cause the greater portion of the material within the dump body of the vehicle to be moved rearwardly as the dump body of the vehicle is elevated.

Still a further object of the invention is to provide guide rollers on the sides and bottom of the mover element so as to guide the mover element in a predetermined path toward the rear of the dump body of the vehicle.

Yet another object of the invention is to provide a winding drum and cable to return the mover element to the forward end of the dump body of the vehicle, as the dump body is lowered.

A still further object of the invention is to provide a torsion spring drive mechanism which will wind the cable onto a winch drum to return the mover element to the forward end of the vehicle dump body.

Yet a further object of the invention is to provide abutments between the rear-most point of travel of the mover element and the rear of the vehicle dump body to prevent the mover element from passing out from the rear end of the dump body, in event a cable should be broken, or other contingency occur which would release the material mover element.

Still another object of the invention is to provide a flexible element which is connected to the forward end of the mover element, which flexible element is trained over at least two sheaves and is anchored to a stationary portion of the dump body support member mounted on the fifth-wheel so as to properly move the mover element rearward as the dump body of the vehicle is elevated.

Yet a further object of the invention is to provide an upwardly and forwardly sloping end on the mover element, so upon rearward movement of the dumpable material within the vehicle body, the material within the dump body is raised upwardly as it moves rearwardly.

BRIEF DESCRIPTION OF THE DRAWING

FIG. 2 is a fragmentary side elevational view of the dump body of a vehicle, substantially as shown in FIG. 1, with parts broken away and shortened and being shown in dashed outline, and with other parts being broken away and shown in section, approximately medially of the dump body of the vehicle, to bring out the details of construction;

FIG. 3 is a sectional view taken on the line 3—3 of FIG. 1, looking in the direction indicated by the arrows;

FIG. 4 is a diagrammatic view of a motor vehicle having a trailer attached thereto, showing the trailer and the mover element in full outline, as they are positioned before the dump body is raised; a second position is shown with the trailer dump body, the mover element and the hydraulic ram being shown in dashed outline as having been pulled partially toward the rear of the vehicle dump body by cable; a third position is shown in dot-dot outline with the mover element at the extreme rear position and showing the hydraulic elevating ram at the upper-most position prior to lowering the vehicle dump body to the full line position shown therein;

FIG. 5 is a sectional view taken on the line 5—5 of FIG. 1, looking in the direction indicated by the arrows, showing the angularly elevated track for the mover element, and showing the mover element approximately at the rear-most position on the angulated track; showing side guide rollers on each side of the mover element and showing support rollers on the track;

FIG. 6 is a perspective view of the angulated track on which the support rollers roll.

DETAILED DESCRIPTION OF THE INVENTION

Figure 1:
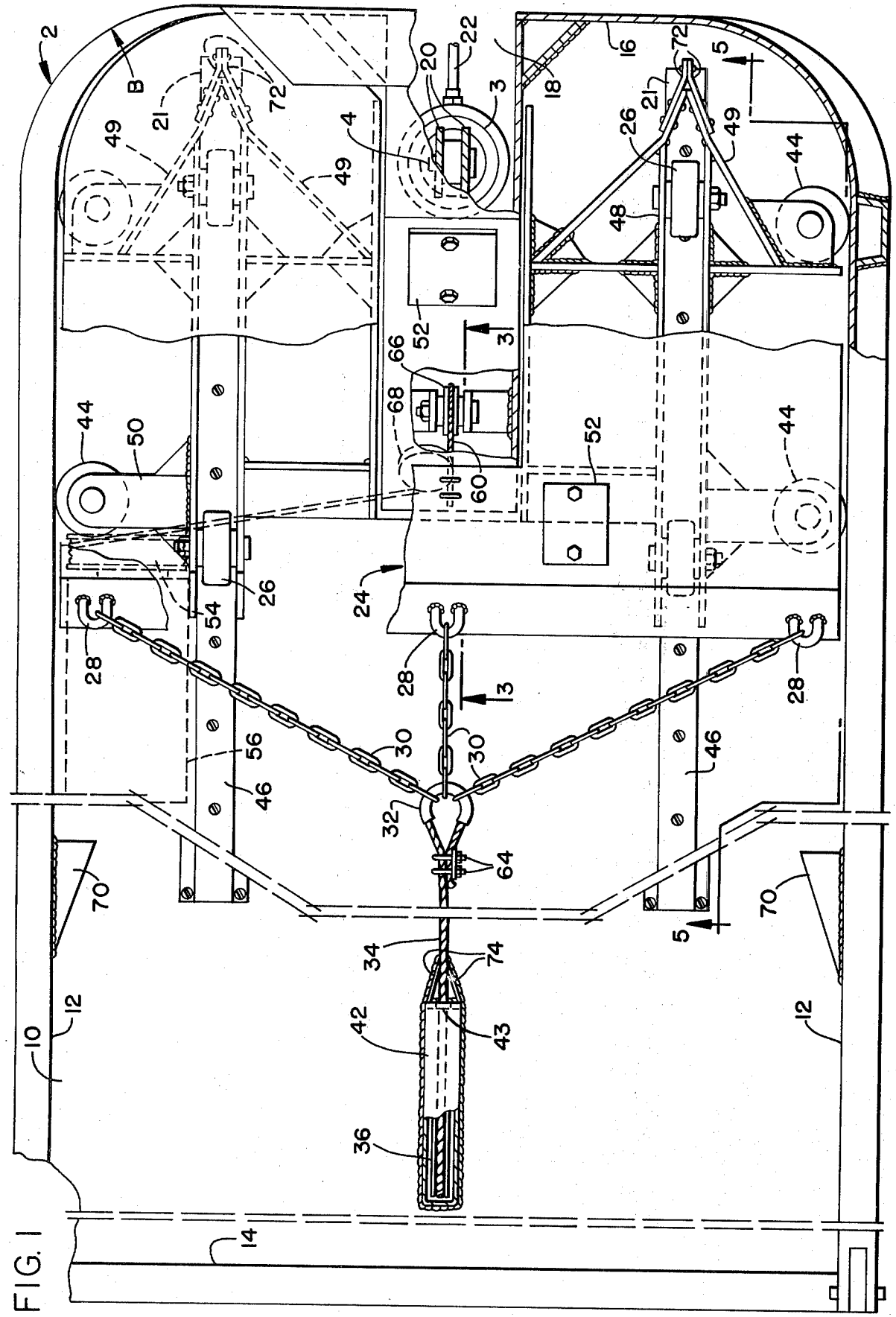
FIG. 1 is a fragmentary top plan view of a vehicle body showing the present invention associated therewith, with parts being broken away and shortened, as shown in dashed outline, and with other parts being broken away and shown in section to bring out the details of construction.

With more detailed reference to the drawing, in which like reference characters designate like parts in the several views thereof, the numeral 1 designates a tractor, such as used in pulling a dump trailer vehicle, designated by the numeral 2. Such dump trailers usually have a hydraulic ram 3 for elevating the forward end of the dump body 2. The upper end of the ram 3 is connected to the forward end of the body 2 by a pivoted connection indicated at 4. The lower end of the ram is pivotally connected at 6 to a dump body support member 7 mounted on the fifth-wheel which is secured to the truck 1 near the rear thereof. While the device has been illustrated as being applied to a trailer of the conventional type, it may also be used on the dump body of a vehicle such as a truck.

The dump trailer 2 has the usual floor 10, with upstanding side walls 12, one on each side, and an end gate 14 at the rear end of the dump body, with the front end closure 16 extending between the side walls 12. Dump trailers may be made in various sizes to accomodate particular needs.

The forward end of the trailer 2 has a chamber or housing 18 formed therein to pivotally receive the upper end of the hydraulic ram or cylinder 3, which cylinder is attached to the trailer body by lugs 20. The purpose of the hydraulic cylinder is for elevating the dump body, as is well known in the art of dump trailers.

When a hydraulic ram is used, the normal hydraulic supply pipe 22 is connected to the lower end of the ram 3 and to a source of hydraulic fluid under pressure (not shown) to furnish fluid thereto.

A track 21 is provided on the bottom 10 of the dump body and is a spaced distance inward from either of the side walls 12. The mover element 24 is mounted in rolling relation on the track 21, which is on the floor of the dump body, by rollers 26. The rollers 26 are in journaled relation relative to the mover element 24 and which rollers are spaced both transversely and longitudinally of the mover element 24. The mover element 24 has eyes 28 fastened along the leading end thereof to receive flexible elements, such as chains 30. The chains 30 are connected to an eye 32, which eye is on the end of cable 34, which cable passes over sheaves 36 and 38 and is anchored, by a fastening means 40, to a dump body support member 7 mounted on the fifth-wheel 8 on the trailer.

The hydraulic cylinder 3 has the upper end thereof pivotally mounted on the body B and moves therewith. The sheave 36 is in rotatable relation to the axis of shaft 37 and sheave 38 is in rotatable relation to the axis of shaft 41. The sheave 36 has a housing 42 thereover to protect the sheave from being buried beneath the dumpable material in the vehicle body in such manner as to foul the rotation thereof.

The mover element 24, of the dump trailer, has rollers 44 thereon, which are in rolling relation with the sides 12 of the dump body 2 so as to maintain the support rollers 26, on the lower side of the mover element 24 on the track 21, which track is secured to the bottom of the dump body so as to guide the rollers 26 onto angulated track 46 so as to elevate the leading end of the mover element 24 as the rollers 26 move onto angulated track 46, which track will best be seen in FIG. 6.

Suitable fastening means are provided to secure the tracks 21 and 46 to the bottom 10 of the dump body of the vehicle.

Suitable structural braces, as indicated at 48 and 50 respectively, are provided to support rollers 44 and 26 to operate in guided relation with respect to the walls 12 and tracks 21 and 46.

Inspection plates 52 are provided at suitable locations to allow the mechanisms to be inspected and to allow for the lubrication thereof.

A torsion drum winch, indicated at 54, usually has a housing 56 in which a pretensioned coil spring 58 is located and which spring is wound up as the cable 34 moves the mover element 24 rearwardly, as the winding cable 60, attached thereto by clamps 64, unwinds from the winch drum 54 until the end of travel of the mover element 24 is reached. Whereupon, as the hydraulic cylinder 3 lowers the dump body 2, the coil spring 58, which is connected in operative relation with the drum 54, causes cable 60 to be simultaneously wound upon the winch drum 54 to retract the mover element 24 to the forwardmost position thereof.

The cable 60 is guided over sheaves 66 and 68 to winch drum 54.

A positive stop or abutment 70 is provided in the inner side of each of the side walls 12, which stops are in alignment with the mover element 24, so in event a cable 60 should break, the abutments or stops 70 will stop the rearward movement of the mover element 24, thereby enabling the broken cable to be reconnected, if it has become broken, or to permit replacement of clamps 64, should they fail, or become worn or broken.

The braces 48, which support the rollers 26, are V-shaped. The apex end of the respective braces extend toward the forward end of body B. Each brace 48 has a V-shaped track wiping element 72 secured thereto. Each wiping element 72 is of yieldable material such as rubber impregnated canvas belting. Each track wiping element 72 extends downward below the V-shaped portion 49 of the respective braces 48 so as to be substantially in wiping contact relation with the upper face of each track member 21, to clean the track so that the rollers 26 will roll freely therealong, as the mover element 24 moves toward the forward end of the dump body B.

Upon rearward movement of the mover element 24, a blade 25 is in close relation to the upper surface of each track member 21 so as to remove substantially all of the dumpable material from the upper surface of the respective track members 21 as the leading end of the transverse material mover element 24 moves rearwardly.

The material mover element 24 moves to the rearmost position thereof, on spaced apart angulated track members 46, whereby the mover element 24 is elevated, so when the dump body raises to the upper-most position, loose dumpable material between the mover element 24 and the front of the dump body B will slide downwardly along the the bottom 10 and pass beneath the mover element 24 to be dumped from the body B through the rear end gate 14, as is best illustrated in FIGS. 5 and 6.

What is claimed is:
1. In an unloader for the dump body of a vehicle, which dump body has sides, a bottom, a closed front end and a rear end gate,
   a. a material mover element extending transversely across the dump body of the vehicle and, when positioned at the forward end, being on the bottom thereof and extending upwardly less than the depth of the material to be dumped,
   b. pull means connected to the rear side of said material mover element and extending rearwardly of the dump body,
   c. power means connected to said pull means to move said material mover element rearwardly,
   d. further pull means connected to the opposite side of said material mover element,
     1. said power means connected to said further pull means to retract said material mover element,
     2. said power means for elevating said dump body comprising a hydraulic cylinder, connected to a source of hydraulic fluid under pressure, said cylinder having the lower end thereof pivotally mounted on the vehicle and having the upper end thereof pivotally connected to the forward end of the dump body,
   e. a track comprising a pair of spaced apart, parallel members mounted on the bottom of said dump body and extending longitudinally thereof,
     1. said material mover element being movably mounted on said track in guided relation,
   f. each said track member being angulated upward from the bottom of the dump body at the forward end toward the rear end of said dump body so that the movement of said material mover element on said track will be upwardly so as to loosen the material being dumped from said dump body.
2. A material mover element for the dump body of a vehicle, as defined in claim 1; wherein
   a. said pull means comprises a cable connected to the leading end of said material mover element,
   b. said dump body has an opening formed in the bottom thereof near the rear end thereof,
     1. a sheave mounted in the opening in the dump body near the rear end thereof, and having a portion thereof extending upwardly through the bottom thereof,
     2. a second sheave mounted on the dump body a spaced distance forward of said first sheave, with the grooves of said sheaves being in aligned relation,
     3. fastening means on the vehicle to anchor the forwardmost end of said cable thereto to maintain said cable against relative movement with respect to said vehicle, so upon application of said power means to said hydraulic cylinder to elevate said dump body, said material mover element will be moved twice as fast as the rate of upward movement of the upper end of the cylinder connected to the dump body.
3. A material mover element for a dump body of a vehicle, as defined in claim 1; wherein
   a. pairs of spaced apart rollers mounted on the lower side of said material mover element,
   b. said material mover element is supported a spaced distance above the floor of the dump body on said longitudinally spaced apart rollers for rolling movement of said mover element along said track,
   c. a pair of said rollers being in rolling engagement with each said upwardly angulated track member.
4. A material mover element for a dump body of a vehicle, as defined in claim 1; wherein
   a. transversely spaced apart, inwardly extending abutments are positioned on the sides of the dump body and are in aligned relation with respect to said material mover element and a spaced distance rearward of the normal rearward movement thereof to prevent unscheduled movement of the mover element out of the rear end of the dump body.
5. A material mover element for a dump body of a vehicle as defined in claim 1; wherein
   a. the vehicle is a trailer having a fifth-wheel and a dump body thereon,
   b. said power means connected to said pull means is a hydraulic ram,
     1. said hydraulic ram being supported on said support member and pivotally connected to the fifth-wheel of said trailer,
     2. the opposite end of said hydraulic ram being pivotally connected to the dump body near the forward end thereof,
     3. said pull means being a cable,
     4. spaced apart sheaves mounted on the dump body and having the grooves thereof in aligned relation,
     5. fastening means on said vehicle to secure an end of said cable to said support member near the lower end of said hydraulic ram, so upon upward movement of said ram, said material mover element will be moved rearwardly of the dump body beneath the dumpable material therein to loosen same and to urge the material to the rear of the dump body at an accelerated rate upon extension of the ram to elevate the dump body.
6. A material mover for a dump body of a vehicle as defined in claim 1; wherein a. said power means, connected to said material mover element to retract said mover element as the dump body is lowered, is a winch,
1. torsion spring means mounted on said dump body and connected to said winch in power transmitting relation to wind said cable onto said winch drum to cause the retraction of said material mover element.

7. A material mover element for a dump body of a vehicle as defined in claim 1; wherein
a. said material mover element having the leading edge thereof so positioned that the rear face thereof extends upwardly and forwardly so as to move dumpable material upwardly as the material mover element moves to the rear of the dump body.

* * * * *